United States Patent
Shaw

(10) Patent No.: US 7,417,389 B2
(45) Date of Patent: Aug. 26, 2008

(54) SPEED CONTROL FOR AN ELECTRIC MOTOR

(75) Inventor: Robert Boyd Shaw, Fargo, ND (US)

(73) Assignee: Deere & Company, Moline, IL (US)

( * ) Notice: Subject to any disclaimer, the term of this patent is extended or adjusted under 35 U.S.C. 154(b) by 154 days.

(21) Appl. No.: 11/588,568

(22) Filed: Oct. 26, 2006

(65) Prior Publication Data

US 2008/0100238 A1     May 1, 2008

(51) Int. Cl.
*H02P 1/00* (2006.01)

(52) U.S. Cl. .................. 318/268; 318/599; 318/779; 318/400.34

(58) Field of Classification Search .............. 318/268, 318/599, 779, 799, 400.34; 388/800, 815
See application file for complete search history.

(56) References Cited

U.S. PATENT DOCUMENTS 5,199,637 A * 4/1993 Adams ................. 236/78 R
6,236,179 B1   5/2001 Lawler et al.

OTHER PUBLICATIONS

Jahmeerbacus, M.I., et al. A Dual-Stage PWM DC to AC Inverter with Reduced Harmonic Distorsion and Switching Losses. Science and Technology-Research Journal, 2000, vol. 5, pp. 80-91 [online]. University of Mauritius, Reduit, Mauritius. [retrieved Oct. 27, 2006]. Retreived from the Internet: <URL: http://www.uom.ac.mu/Research&Consultancy/UOM_JORN/Science%20 &%20Technology%20Vol%205/jahmeebacus%20vol%205.pdf>.

Pichler, P. et al. Demand-based Induction Motor Design for Diverging Electrical Vehicle Applications Powered by Battery. Department of Electrical Engineering, University of Leoben, Austria. [online]. [retrieved Oct. 27, 2006]. Retrieved from the Internet: <URL: http://www.ansoft.com/news/articles/Induction_Motor_Design_for_Electric_Vehicles.pdf>.

* cited by examiner

*Primary Examiner*—Karen Masih

(57) ABSTRACT

A system and method for controlling a rotational speed associated with a shaft or rotor of an electric motor comprises establishing a target rotational speed associated with a shaft or rotor of an electric motor. A sensor detects an actual rotational speed associated with the shaft or rotor of an electric motor. Speed error data is determined. The speed error defined as a difference between the target rotational speed and the actual rotational speed. A first duty cycle factor is determined based on the speed error data and a first gain constant. A second duty cycle factor is determined based on the speed error data and a second gain constant. Duty cycle input data is calculated for the electric motor based on a sum of the first duty cycle factor, the second duty cycle factor, and the target speed.

20 Claims, 4 Drawing Sheets

SPEED CONTROL FOR AN ELECTRIC MOTOR

FIELD OF THE INVENTION

This invention relates to speed control for an electric motor.

BACKGROUND OF THE INVENTION

An electric motor may be used to drive an output shaft or member, such as one or more cutting blades of a mower or another implement. The speed of the cutting blades (e.g., reel mower cutting blade) may vary with the load presented by variations in ground elevation, vegetation density, vegetation moisture content, or otherwise. In addition, the speed of the cutting blades may fluctuate based on variation in the system voltage of equipment, because of other electrical loads associated with the equipment, electrical energy storage system health (e.g., battery health or state of charge), or otherwise. The fluctuation in the speed of the cutting blades may detract from finish and uniformity of the cut or mowed vegetation, for instance. Thus, there is a need to maintain a constant speed of the cutting blade to improve cutting or mower performance.

SUMMARY OF THE INVENTION

A system and method for controlling a rotational speed associated with a shaft or rotor of an electric motor comprises establishing a target rotational speed associated with a shaft or rotor of an electric motor. A sensor detects an actual rotational speed associated with the shaft or rotor of an electric motor. Speed error data is determined. The speed error is defined as a difference between the target rotational speed and the actual rotational speed. A first duty cycle factor is determined based on the speed error data and a first gain constant. A second duty cycle factor is determined based on the speed error data and a second gain constant. A control signal or control data is calculated for the electric motor based on a sum of the first duty cycle factor, the second duty cycle factor, and the target rotational speed.

DESCRIPTION OF THE PREFERRED EMBODIMENT

Figure 1:
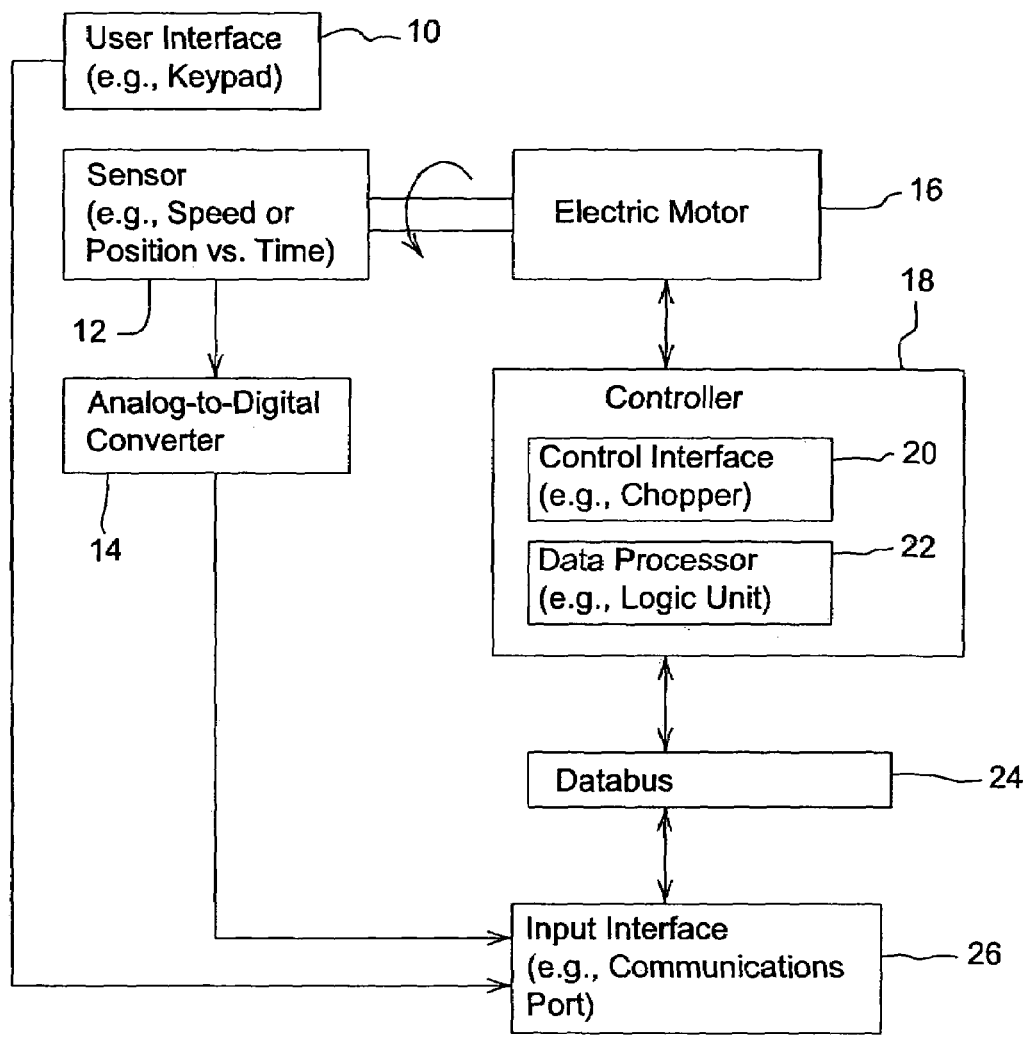
FIG. 1 is one embodiment of a block diagram of system for speed control of an electric motor.

In accordance with one embodiment, FIG. 1 shows a block diagram of a system 11 for speed control of an electric motor 16. The system 11 of FIG. 1 comprises a controller 18 that is coupled to an electric motor 16. The controller 18 may receive input data from a speed sensor 12, a user interface 10, or both via an input interface 26 and a databus 24. In one embodiment, an analog-to-digital converter 14 is interposed between the sensor 12 and the input interface 26. An input interface 26 (e.g., communications port) receives input data from the user interface 10, the sensor 12, or both. The input interface 26 communicates with the controller 18 via a databus 24.

In one embodiment, the controller 18 comprises a logic unit 20 and a data processor 22 and a control interface 20. The data processor 22 may comprise a logic unit, an arithmetic logic unit, a digital signal processor, a logic circuit, a programmable logic array, a microcontroller, a microprocessor, or another data processor. The control interface 20 may comprise an electronic switching device or circuit, such as a chopper, an oscillator, or a signal generator. In one embodiment, the oscillator, signal generator, or chopper is associated with a pulse width modulator for varying the average electrical energy (e.g., average voltage level) applied to the electric motor 16 to vary its rotational speed.

The user interface 10 may comprise a switch, a keypad, a keyboard, a pointing device (e.g., an electronic mouse or trackball), a display (e.g., a liquid crystal display), or another device for entering input data or receiving output data.

In an alternate embodiment, the user interface 10 may be omitted, used for maintenance, or used for initial setup. For example, the user interface 10 may be disconnected and removed after establishing a target rotational speed of a shaft or rotor of the electric motor as a factory or initial setting.

The input interface 26 may comprise one or more of the following: a port, an input/output port, a communications transceiver, a receiver, and a memory buffer.

The sensor 12 may comprise a speed sensor, a Hall Effect sensor, a magneto-resistive sensor, a position encoder, a position sensor, a position encoder and a timer, a position sensor and a timer, a magnetic sensor, an optical sensor, a back electromotive force (EMF) sensor, a device for detecting back EMF, or another sensor or device for detecting the rotational velocity of the shaft or rotor of the electric motor 16. For some configurations of electric motors (e.g., direct current motors), the back EMF is proportional to the speed of the rotor or shaft of the electric motor. If the sensor 12 provides analog speed data as the input data, the analog speed data is fed into an analog-to-digital converter 14 to convert the analog speed data into digital speed data. However, if the sensor 12 provides digital speed data, the analog-to-digital converter 14 may be omitted.

The electric motor 16 may comprise any of the following types of electric motors, among others: an alternating current (AC) electric motor, an alternating current induction motor, an alternating current synchronous motor, a multiphase alternating current motor, and a switched reluctance motor. In an alternate embodiment, the electric motor 16 may comprise a direct current motor (DC), or a brushless direct current motor.

The user interface 10 establishes a target rotational speed associated with a shaft or rotor of an electric motor 16. The sensor 12 detects an actual rotational speed associated with the shaft or rotor of an electric motor 16. A controller 18 or data processor 22 determines speed error data associated with the actual rotational speed. The speed error is defined as a difference between a target rotational speed and the actual rotational speed. The controller 18 or data processor 22 determines a first duty cycle factor based on the speed error data and a first gain constant. The controller 18 or data processor 22 is arranged to determine a second duty cycle factor based on the speed error data and a second gain constant. The data processor 22 is programmed to calculate a control signal or control data for the electric motor 16 based on a sum of the first duty cycle factor, the second duty cycle factor, and the target speed.

The controller 18 generates a control signal or control data for controlling a rotational speed of a shaft or rotor of the electric motor 16 based on one or more of the following: sensor data (e.g., actual rotational speed), user input data (e.g., target rotational speed), and a control instructions (e.g., a control algorithm). In one embodiment, the control signal or data is based on a desired duty cycle (e.g., a desired pulse width modulation) for attaining a target rotational speed of the electric motor 16. For instance, the desired duty cycle refers to a sum of the first duty cycle factor, the second duty cycle factor, and the target speed.

The control signal may vary based on whether the electric motor 16 comprises a direct current motor or an alternating current motor. In general, for an alternating current motor as the electric motor 16, the rotational speed of the shaft or rotor of the motor is proportional to the frequency of the control signal. For example, the speed of a shaft or rotor of the electric motor 16 may be controlled by pulse width modulation (e.g., varying a pulse width or pulse duration of a control signal) or varying a frequency of a pulse train. In general, for a direct current motor, the rotational speed of the shaft or the rotor is proportional to the voltage level or electric energy applied; the direction of the direct current motor may be changed by reversing the polarity applied to its terminals. For example, pulse width modulation may be applied to a direct current motor to control an average energy level (e.g., voltage level) applied to the direct current motor. The rotational speed of the motor may be adjusted by selecting the average voltage level.

The controller 18 applies control instructions (e.g., a control algorithm) to the sensor data provided by the sensor 12, the user input data provided by the user interface 10, or both. The control instructions may comprise one or more of the following items: a look-up table, a chart, rules (e.g., if-then rules), one or more equations for determining a duty cycle command or pulse width modulation command data based on the sensor data, the user input data, or both, and one or more equations for determining a duty cycle command or pulse width modulation command data based on detected rotational speed data and target rotational speed data.

In one embodiment, the control instructions may comprise one or more equations to determine a duty cycle command, a pulse width modulation command or control interface input data for the control interface 20. For example, the equation may represent the sum of a first duty cycle factor, a second duty cycle factor, and a target speed factor. The first duty cycle factor comprises a proportional duty cycle factor in which the first duty cycle factor is proportional to the speed error data. The second duty cycle factor comprises an integral duty cycle factor in which the second duty cycle factor is based on a previous integral duty cycle factor and the speed error data.

The control interface 20 or the controller 18 receives the duty cycle command, a pulse width modulation command or control interface input data from the data processor 22. The control interface 20 or the controller provides a pulse width modulated signal, control data, or another control signal for the electric motor 16 based on the target rotational speed of the electric motor 16 and the duty cycle command, the pulse width modulation command, or the control interface input data. The control signal (e.g., pulse width modulated control signal) or control data may be used to activate the electric motor 16 in accordance with a target duty cycle. For instance, a target duty cycle may be expressed a percentage of time (e.g., 0 percent to approximately 100 percent) in which the electric motor 16 is active.

Figure 2:
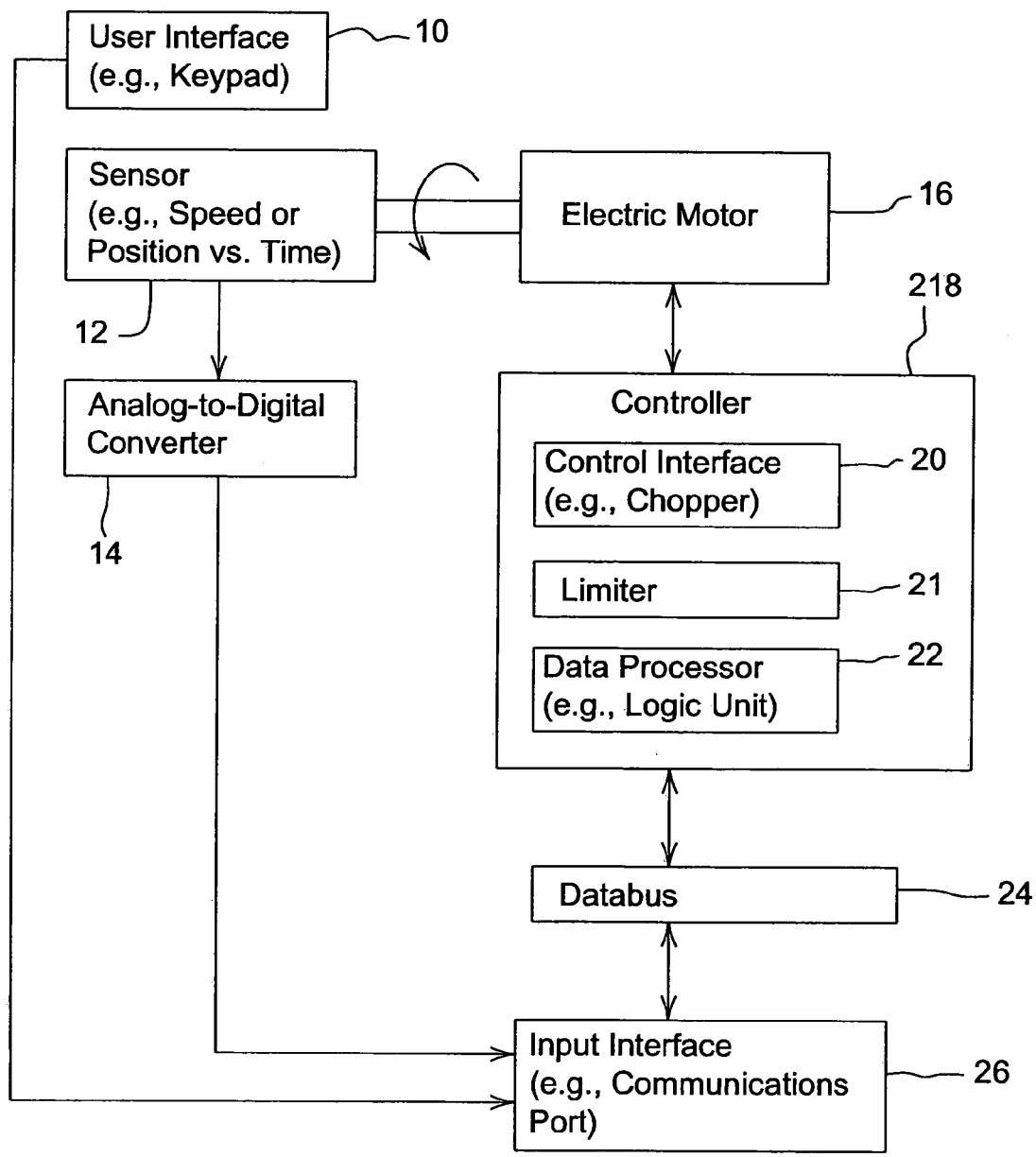
FIG. 2 is another embodiment of a block diagram of system for speed control of an electric motor.

The system 111 of FIG. 2 is similar to the system 11 of FIG. 1, except the system 111 of FIG. 2 comprises a controller 218 that further includes a limiter 21. Like reference numbers in FIG. 1 and FIG. 2 indicate like elements.

The limiter 21 limits the second duty cycle factor to a maximum value. The maximum value may be programmed by a user or entered as a factory setting via the user interface 10, for example. The overall duty cycle and the second duty cycle are generally selected to be compatible with the specifications or ratings of the electric motor 16. Accordingly, the limiter 21 may limit the overall duty cycle of the electric motor 16 to achieve a target overall duty cycle (e.g., a generally continuous duty cycle, an intermittent duty cycle, or otherwise.) The limiter 21 may prevent thermal damage to the electric motor 16 (e.g., burning out one or more motor windings.)

Figure 3:
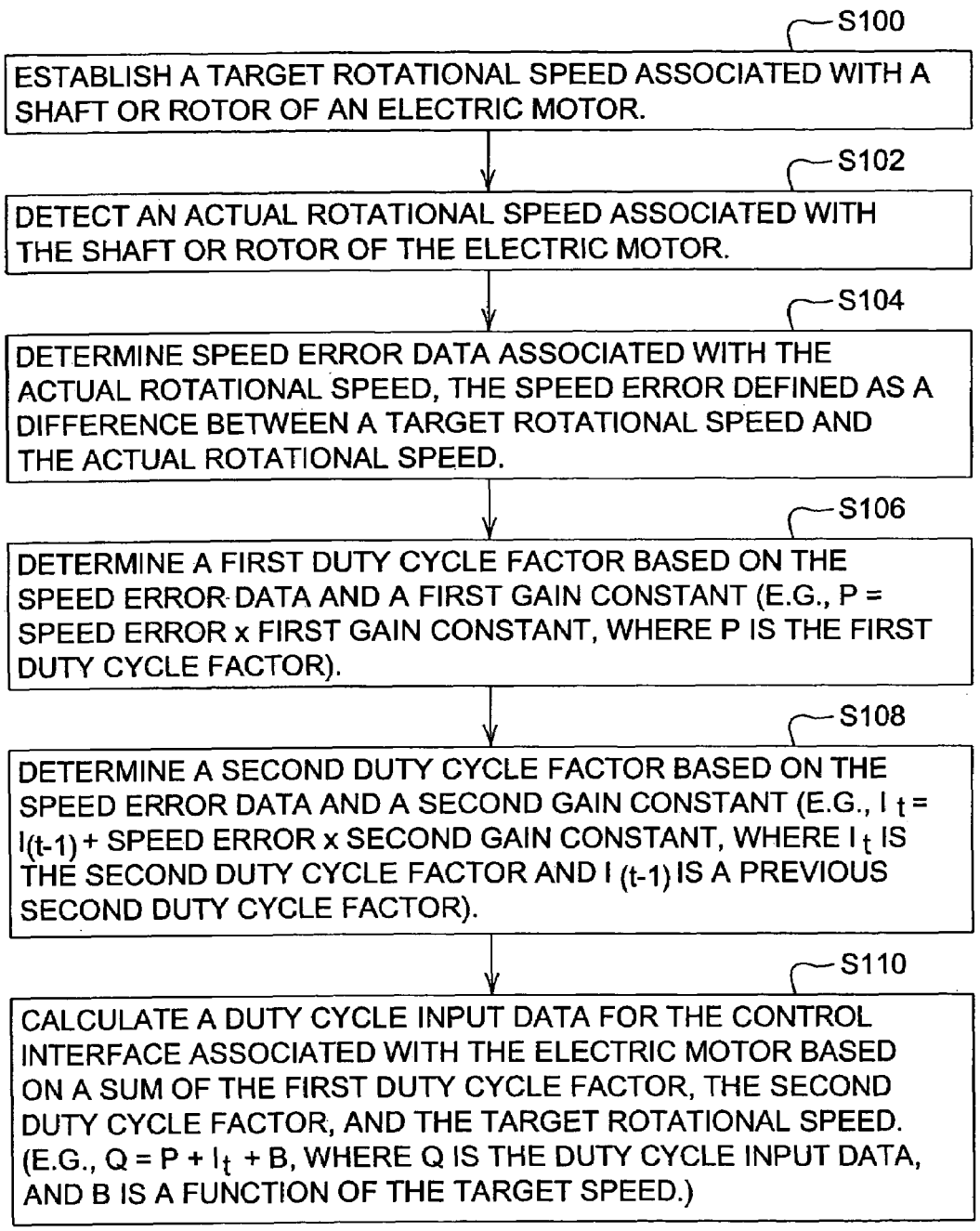
FIG. 3 is a method for speed control of an electric motor.

FIG. 3 illustrates a method for controlling a speed of a rotor or shaft of the electric motor 16. The method of FIG. 3 begins in step S100.

In step S100, a user interface 10 or a controller 18 establishes a target rotational speed associated with a shaft or rotor of an electric motor 16. Step S100 may be carried out in accordance with various alternative techniques, which may be applied alternatively or cumulatively. Under a first technique, a user interface 10 supports a user's entry of a target rotational speed of the rotor or shaft of the electric motor 16. The target rotational speed may be selected based on a target velocity for a rotating blade of a mower with due consideration for its predicted or actual performance in cutting vegetation, for instance. Under a second technique, a controller 18 is programmed (e.g., at the factory) with a target rotational speed of the rotor or shaft of the electric motor. The target rotational speed may be selected based on the task at hand and the specifications of the electric motor 16, for instance.

In step S102, a sensor 12 detects an actual rotational speed associated with the shaft or rotor of the electric motor 16. For example, the sensor 12 may detect the actual rotational speed based on a least one of a Hall-effect sensor, a position encoder, a position sensor, and a device for determining back electromotive force (EMF).

In step S104, a data processor 22 determines speed error data associated with the actual rotational speed. The speed error is defined as a difference between a target rotational speed and the actual rotational speed.

In step S106, a data processor 22 or controller 18 determines a first duty cycle factor based on the speed error data and a first gain constant. Step S106 may be carried out based on various definitions of the first duty cycle factor, which may be applied individually or cumulatively. Under a first definition, the first duty cycle factor (P) comprises a proportional duty cycle factor in which the first duty cycle factor is proportional to the speed error data. Under a second definition, the first duty cycle factor (P) comprises a product of the speed error data (E) and the first gain constant ($K_1$). The second definition may be expressed in accordance with the following equation: $P=E \times K_1$, where P is the first duty cycle factor, E is the speed error data, and where $K_1$ is the first gain constant.

In step S108, a data processor 22 or controller 18 determines a second duty cycle factor based on the speed error data and a second gain constant. Step S108 may be carried out based on various definitions of the second duty cycle factor, which may be applied individually or cumulatively. Under a first definition, the second duty cycle factor ($I_t$) comprises an integral duty cycle factor in which the second duty cycle factor is based on a previous integral duty cycle factor ($I_{(t-1)}$) and the speed error data (E). Under a second definition, the second duty cycle ($I_t$) comprises a sum of a previous second duty cycle factor ($I_{(t-1)}$) and a product of the speed error data (E) and a second gain constant ($K_2$), distinct from the first gain constant. The second definition may be expressed in accordance with the following equation: $I_t=I_{(t-1)}+(E \times K_2)$, where $I_t$ is the present second duty cycle factor, $I_{(t-1)}$ is the previous second duty cycle factor, E is the speed error data, and where $K_2$ is the second gain constant. Under a third definition, a limiter may limit the second duty cycle ($I_t$) factor to a maximum value. The maximum value may be selected based on specifications of the motor 16, the thermal operating range of the motor 16, or a user defined maximum duty cycle.

In step S110, a data processor 22 or controller 18 calculates a duty cycle input data for the control interface 20 of the electric motor 16 based on a sum of the first duty cycle factor, the second duty cycle factor, and the target speed. In one embodiment, the controller 18 or the control interface 20 uses the duty cycle input data to control a pulse width modulated control signal or data signal to the electric motor 16. The pulse width modulated control signal may be generated in accordance with the following equation: $Q=P+I_t+B$, where Q is the desired pulse width modulation value or the overall duty cycle value, P is the first duty cycle factor, $I_t$ is the present second duty cycle factor, and B is a value of a function based on or proportional to the target rotational speed of the electric motor 16. The equation can be normalized such that Q expresses the overall duty cycle value in a percentage within a range from approximately 0 percent to approximately 100 percent.

Figure 4:
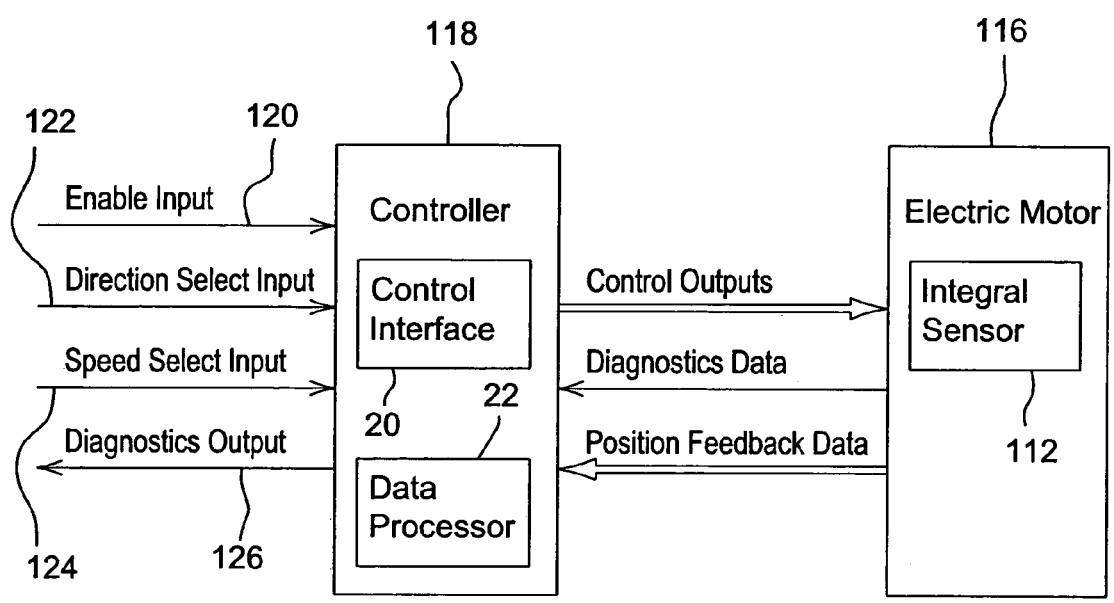
FIG. 4 is yet another embodiment of a block diagram of a system for speed control of an electric motor.

FIG. 4 illustrates an alternative embodiment of a system 211 for controlling a speed of a rotor or shaft of an electric motor 116. Like reference numbers in FIG. 1 and FIG. 4 indicate like elements. The system 211 of FIG. 4 comprises a controller 118 coupled to an electric motor 116. The controller 118 comprises a control interface 20 and a data processor 22, whereas the electric motor 116 comprises an integral sensor 112.

The controller 118 is a capable of receiving an enable input 120 to turn off and turn on the electric motor 116, a direction select input 122 to determine the direction of rotation of the motor shaft of the electric motor 116, and a speed select input 124 to determine a target rotational speed of the rotor or shaft of the electric motor 116. The controller 118 generates a diagnostics output 126 (e.g., for a diagnostics lamp) that may be associated with a display, a light emitting diode driver and one or more light emitting diodes, a liquid crystal display, an incandescent light, a fluorescent light or otherwise.

The controller 118 is capable of providing control outputs to the electric motor 116. The control outputs may represent a pulse width modulation signal, data or another control signal for controlling the speed of the electric motor 116.

An integral sensor 112 is associated with or integrated into the electric motor 116. The integral sensor 112 may provide sensor data (e.g., position feedback data) for monitoring a position, speed or velocity of the shaft or rotor of the electric motor 116. In FIG. 3, the sensor 112 may comprise an integral speed sensor, a Hall Effect sensor, a magneto-resistive sensor, a position encoder and a timer, a position sensor and a timer, a magnetic sensor, an optical sensor, a back electromotive force (EMF) sensor, or another sensor for detecting the rotational velocity of the shaft or rotor of the electric motor 116. If the integral sensor 112 comprises a position sensor or position encoder, the integral sensor 112 may be associated with a clock or timer to derive a speed or velocity associated with the shaft of the motor based on a shift in position of the shaft of the electric motor 116.

The electric motor 116 may transmit diagnostic data to the controller 118 periodically, at predefined intervals, or upon the triggering of an event, condition, or alarm. The electric motor 116 may comprise a thermister, a thermostat, a thermocouple, or another thermal sensor that generates a diagnostic data, or a diagnostic signal, when the motor meets or exceeds a threshold minimum temperature, for example. Accordingly, the diagnostic data or diagnostic signal may comprise a reading of the thermal sensor 12 that overrides or influences the controller 118 to shut-down or turn-off the electric motor 116 to prevent thermal damage to the motor 116 or its components.

Having described the preferred embodiment, it will become apparent that various modifications can be made without departing from the scope of the invention as defined in the accompanying claims.

The invention claimed is:

1. A method for controlling a rotational speed associated with a shaft or rotor of an electric motor, the method comprising:
   establishing a target rotational speed associated with a shaft or rotor of an electric motor;
   detecting an actual rotational speed associated with the shaft or rotor of an electric motor;
   determining speed error data associated with the actual rotational speed, the speed error defined as a difference between the target rotational speed and the actual rotational speed;
   determining a first duty cycle factor based on the speed error data and a first gain constant;
   determining a second duty cycle factor based on the speed error data and a second gain constant;
   calculating duty cycle input data for control of the electric motor based on a sum of the first duty cycle factor, the second duty cycle factor, and the target rotational speed.

2. The method according to claim 1 wherein the detecting further comprises detecting the actual rotational speed based on a least one of a Hall effect sensor, a position encoder, a position sensor, and a device for determining back electromotive force.

3. The method according to claim 1 wherein the first duty cycle factor comprises a proportional duty cycle factor in which the first duty cycle factor is proportional to the speed error data.

4. The method according to claim 1 wherein the second duty cycle factor comprises an integral duty cycle factor in which the second duty cycle factor is based on a previous second duty cycle factor and the speed error data.

5. The method according to claim 4 further comprising limiting the second duty cycle factor to a maximum value.

6. The method according to claim 1 wherein the duty cycle input data is associated with control of a pulse width modulated control signal to the electric motor.

7. The method according to claim 6 wherein the electric motor comprises an alternating current electric motor.

8. The method according to claim 6 wherein the electric motor comprises a brushless direct current electric motor.

9. The method according to claim 1 wherein the first duty cycle factor comprises a product of the speed error data and the first gain constant.

10. The method according to claim 9 wherein the second duty cycle comprises a sum of a previous second duty cycle factor and a product of the speed error data and a second gain constant, distinct from the first gain constant.

11. A system for controlling a rotational speed associated with a shaft or rotor of an electric motor, the system comprising:
   a user interface for establishing a target rotational speed associated with a shaft or rotor of an electric motor;
   a sensor for detecting an actual rotational speed associated with the shaft or rotor of an electric motor;
   a data processor for determining speed error data associated with the actual rotational speed, the speed error defined as a difference between the target rotational speed and the actual rotational speed; the data processor arranged to determine a first duty cycle factor based on the speed error data and a first gain constant; the data processor arranged to determine a second duty cycle factor based on the speed error data and a second gain constant; the data processor programmed to calculate duty cycle input data for the electric motor based on a sum of the first duty cycle factor, the second duty cycle factor, and the target speed.

12. The system according to claim 11 wherein the sensor comprises at least one of a Hall effect sensor, a position encoder, a position sensor, and a device for determining back electromotive force.

13. The system according to claim 11 wherein the first duty cycle factor comprises a proportional duty cycle factor in which the first duty cycle factor is proportional to the speed error data.

14. The system according to claim 11 wherein the second duty cycle factor comprises an integral duty cycle factor in which the second duty cycle factor is based on a previous second duty cycle factor and the speed error data.

15. The system according to claim 14 further comprising a limiter for limiting the second duty cycle factor to a maximum value.

16. The system according to claim 11 wherein the duty cycle input data controls a pulse width modulated control signal to the electric motor.

17. The system according to claim 11 wherein the electric motor comprises an alternating current electric motor.

18. The system according to claim 11 wherein the electric motor comprises a brushless direct current electric motor.

19. The system according to claim 11 wherein the first duty cycle factor comprises a product of the speed error data and the first gain constant.

20. The system according to claim 19 wherein the second duty cycle comprises a sum of a previous second duty cycle factor and a product of the speed error data and a second gain constant, distinct from the first gain constant.

* * * * *